(12) United States Patent
Segeral

(10) Patent No.: US 6,286,367 B1
(45) Date of Patent: Sep. 11, 2001

(54) METHOD OF EVALUATING THE EFFLUENT OF A HYDROCARBON WELL BY MEANS OF A MULTIPHASE FLOWMETER, AND INSTALLATION IMPLEMENTING THE SAME

(75) Inventor: Gérard Segeral, Gif sur Yvette (FR)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/274,074

(22) Filed: Mar. 22, 1999

(30) Foreign Application Priority Data

Mar. 30, 1998 (FR) .................................................. 98 03905

(51) Int. Cl.$^7$ .............................. G01F 1/44; G01F 13/00; E21B 49/08; F17D 3/00
(52) U.S. Cl. .................................... 73/152.19; 73/152.42; 73/152.21; 73/61.47; 73/61.44; 73/861.63; 73/861.62
(58) Field of Search .......................... 73/152.19, 152.42, 73/152.55, 152.21, 61.41, 61.47, 861.63, 61.44

(56) References Cited

U.S. PATENT DOCUMENTS

| | | | |
|---|---|---|---|
| 3,946,605 | * | 3/1976 | Yamazaki et al. ...................... 73/155 |
| 4,015,194 | * | 3/1977 | Eppling ...................................... 324/1 |
| 4,168,624 | | 9/1979 | Pichon ...................................... 73/195 |
| 4,429,581 | * | 2/1984 | Furmaga ............................. 73/861.04 |
| 4,441,361 | * | 4/1984 | Carlson et al. ......................... 73/155 |
| 4,522,218 | * | 6/1985 | Konak ....................................... 137/3 |
| 4,727,489 | * | 2/1988 | Frazier et al. ......................... 364/422 |
| 4,836,017 | * | 6/1989 | Bozek ...................................... 73/155 |
| 4,887,464 | * | 12/1989 | Tannenbaum et al. .................. 73/153 |
| 5,042,297 | * | 8/1991 | Lessi ........................................ 73/155 |
| 5,190,103 | * | 3/1993 | Griston et al. ......................... 166/250 |
| 5,211,842 | * | 5/1993 | Tuss et al. ............................... 210/87 |
| 5,633,470 | * | 5/1997 | Song ................................. 73/861.04 |

FOREIGN PATENT DOCUMENTS

| | | |
|---|---|---|
| 0 702 211 | 3/1996 | (EP) . |
| 2 386 021 | 10/1978 | (FR) . |
| 2 317 019 | 3/1998 | (GB) . |

\* cited by examiner

Primary Examiner—Daniel S. Larkin
Assistant Examiner—David J. Wiggins
(74) Attorney, Agent, or Firm—John J. Ryberg; Brigitte L. Jeffery

(57) ABSTRACT

A multiphase flowmeter (30) is mounted on the piping via which a multiphase fluid flows out from a hydrocarbon well, so as to measure the flow rates of the various phases of the fluid. A back-pressure valve (34) is placed in the piping downstream from the flowmeter (30) so as to enable the pressure in the flowmeter to be adjusted, whereby the flow conditions of the fluid in the flowmeter (30) can be made compatible with the measurement domain of the flowmeter.

19 Claims, 3 Drawing Sheets

METHOD OF EVALUATING THE EFFLUENT OF A HYDROCARBON WELL BY MEANS OF A MULTIPHASE FLOWMETER, AND INSTALLATION IMPLEMENTING THE SAME

BACKGROUND OF THE INVENTION

The invention relates to a method of evaluating the effluent of a hydrocarbon well by means of a multiphase flowmeter. The invention also relates to an installation implementing such method.

When operating an oil well, it is necessary to monitor a large number of parameters concerning the multiphase fluid that flows out from the well. Such parameters vary over time, and the operating conditions must be adapted to take into account such variation.

The flow rates of the various phases contained in the fluid (e.g. a gas phase constituted by gaseous petroleum and two liquid phases constituted by water and liquid petroleum) are among the parameters to be monitored. Such monitoring may be performed either continuously, or periodically, e.g. every two or three months.

A first known technique for measuring the flow rates of the various phases of the fluid flowing out from an oil well consists in measuring the flow rates separately once the various phases of the fluid have been separated. In which case, the fluid passes successively through a plurality of separators in which gravity is used to separate the gas phase from the liquid phases, and then to separate the liquid phases from each other. The flow rates of each of the phases can thus be measured separately at the corresponding outlets of the separators.

In such existing flow-rate measurement installations, valves are placed downstream from the flowmeters provided to measure the separate flow rates of the various phases, in the outlet piping of the separators. Such valves serve to regulate the level of the interface between the phases to be separated inside the separator, and to regulate the pressure in the separator to a reference value.

That type of installation suffers from the drawback of taking up a particularly large amount of space because of the large dimensions of the separators.

For that reason, research and experimentation is being done with a view to measuring the flow-rates of the various phases of the oil well effluent by means of a multiphase flowmeter placed directly in the piping via which the fluid flows out from the well. Such flowmeters take up significantly less space, thereby enabling them, in particular, to be moved from one well to another to perform periodic measurements on each of them.

There are numerous types of multiphase flowmeters. By way of example, mention may be made of the flowmeters described in French patent applications No 2 764 065 and 2 767 919.

When such a multiphase flowmeter is used, the pressure in the flowmeter is controlled entirely by the conditions at the wellhead, i.e. immediately at the outlet of the oil well, and by the conditions much further downstream in the production line, at the place where the various phases of the fluid are finally separated.

SUMMARY OF THE INVENTION

There is provided according to the invention a method of evaluating the effluent of a hydrocarbon well by means of a multiphase flowmeter connected to the well, comprising the step of adjusting the pressure in the flowmeter so that the respective flow rates of the liquid phases and of the gas phase of the fluid lie within the measurement domain of the flowmeter.

The pressure in the flowmeter can be varied independently of the conditions that prevail at the outlet of the oil well and downstream from the flowmeter, where the various phases of the fluid are finally separated.

Thus, when the flow rates of the liquid phases and of the gas phase of the fluid are situated outside the measurement domain of the flowmeter, it is possible to bring these flow rates into said measurement domain by adjusting the pressure in the flowmeter.

In addition, adjusting the pressure in the flowmeter enables measurements to be taken for various values of said pressure, and enables an optimum separation pressure to be established.

Furthermore, it is possible, by taking appropriate measurements, to verify that the pressure drop induced in this way in the piping at the flowmeter does not result in the flow of the fluid becoming critical. If the flow does become critical, then the flow-rate measurements might be erroneous under normal operating conditions, i.e. once the measurement installation has been removed.

When a venturi flowmeter is used, the pressure is adjusted so that the pressure drop in the venturi lies between a maximum pressure drop and a minimum pressure drop that are acceptable for the flowmeter.

Regardless of the flowmeter used, die pressure is adjusted so that the ratio between the flow rates of the gas phase and of the liquid phase; is lower than a maximum ratio that can be measured by the flowmeter, In a preferred embodiment of the invention, the pressure is adjusted by means of an adjustable back-pressure valve mounted in the piping at the outlet of the flowmeter.

Preferably, the back-pressure valve defines a flow section that is adjustable between a non-zero minimum section having its flow properties above the minimum acceptable flow characteristics for the flowmeter, allowing a limited flow of fluid to pass through, and a maximum section in the vicinity of the section having its flow properties below the maximum acceptable flow characteristics for the flowmeter of the piping, The back-pressure valve may in particular be a cage valve or a needle valve.

In the preferred embodiment of the invention, the back-pressure valve is removably mounted in a T of the piping.

The invention also provides an installation for the evaluation of the effluent of a hydrocarbon well, comprising a multiphase flowmeter placed downstream from the well and upstream from a region in which there is a determined pressure, and means for adjusting the pressure in the flowmeter so that the restrictive flow rates of the liquid

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings.

DETAILED DESCRIPTION OF THE PREFERRED EMBODIMENT

Figure 1:
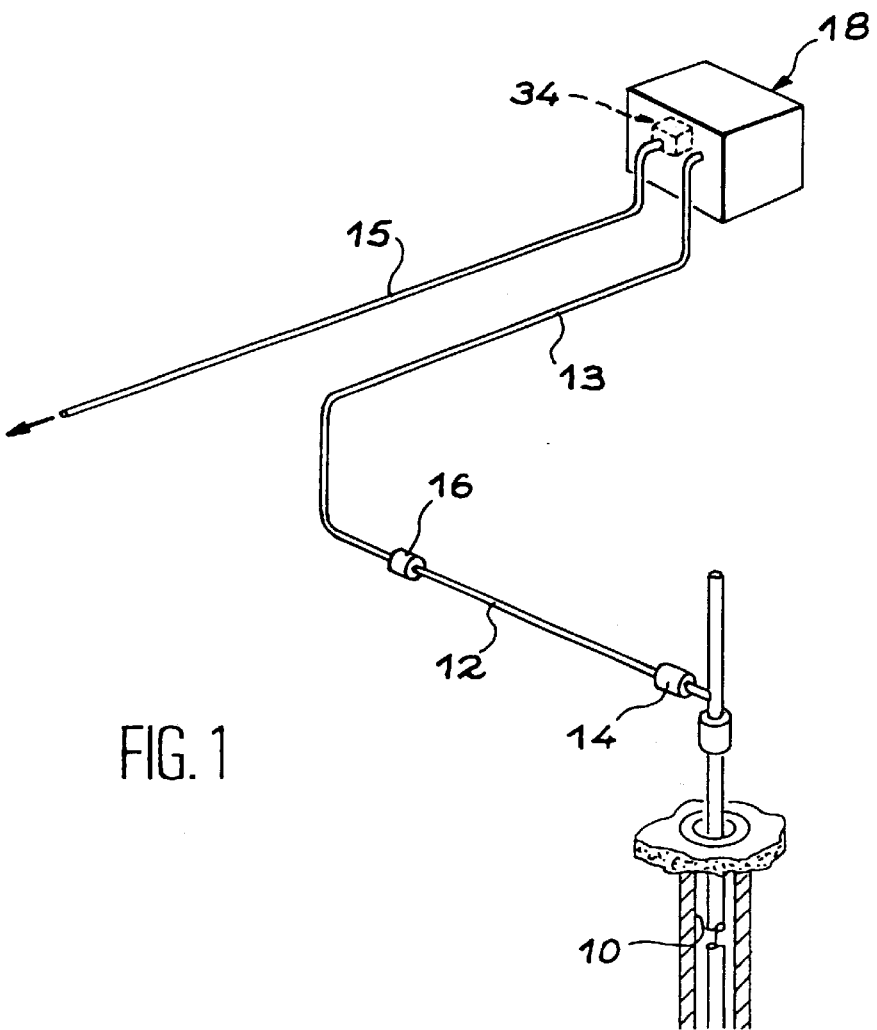
FIG. 1 is a perspective view showing very diagrammatically how a flow-rate measurement installation is mounted in the production line of a hydrocarbon well.

In FIG. 1, reference 10 designates a hydrocarbon well in operation. The well effluent i.e. the multiphase fluid coming from the subsurface hydrocarbon reservoir (not shown) traversed by the well 10 flows out from said well via a production line. At its generally remote opposite end (not shown), the production line is connected to separators beyond which the various phases of the well effluent are processed or stored separately.

At the wellhead, i.e. immediately at the outlet of the well 10, the production line is constituted by a first piping segment 12 which is provided in particular with a safety vale 14, a choke 16, and pressure-measurement means (not shown).

In general, the choke 16 is fixed and makes it possible to establish an optimum fluid flow rate. For this purpose, the choke 16 induces a predetermined restriction into the production line so as to ensure that the flow of the fluid is critical when the pressure of the well is sufficient. The flow-rate of the fluid which flows through a second segment of piping 13 downstream from the choke 16 is then independent of the pressure at which separation takes place at the other end of the production line. In practice, critical flow is obtained for the fluid when the pressure upstream from the choke is more than twice the pressure downstream therefrom.

Downstream from the choke 16, on the second segment of piping 13, an installation 18 is placed that makes it possible to measure the flow rates of the various phases of the well effluent. This installation 18 may be mounted permanently on the piping segment 13, or else it may be put in place periodically, e.g. every two or three months, when a new flow-rate measurement is to be taken.

Figure 2:
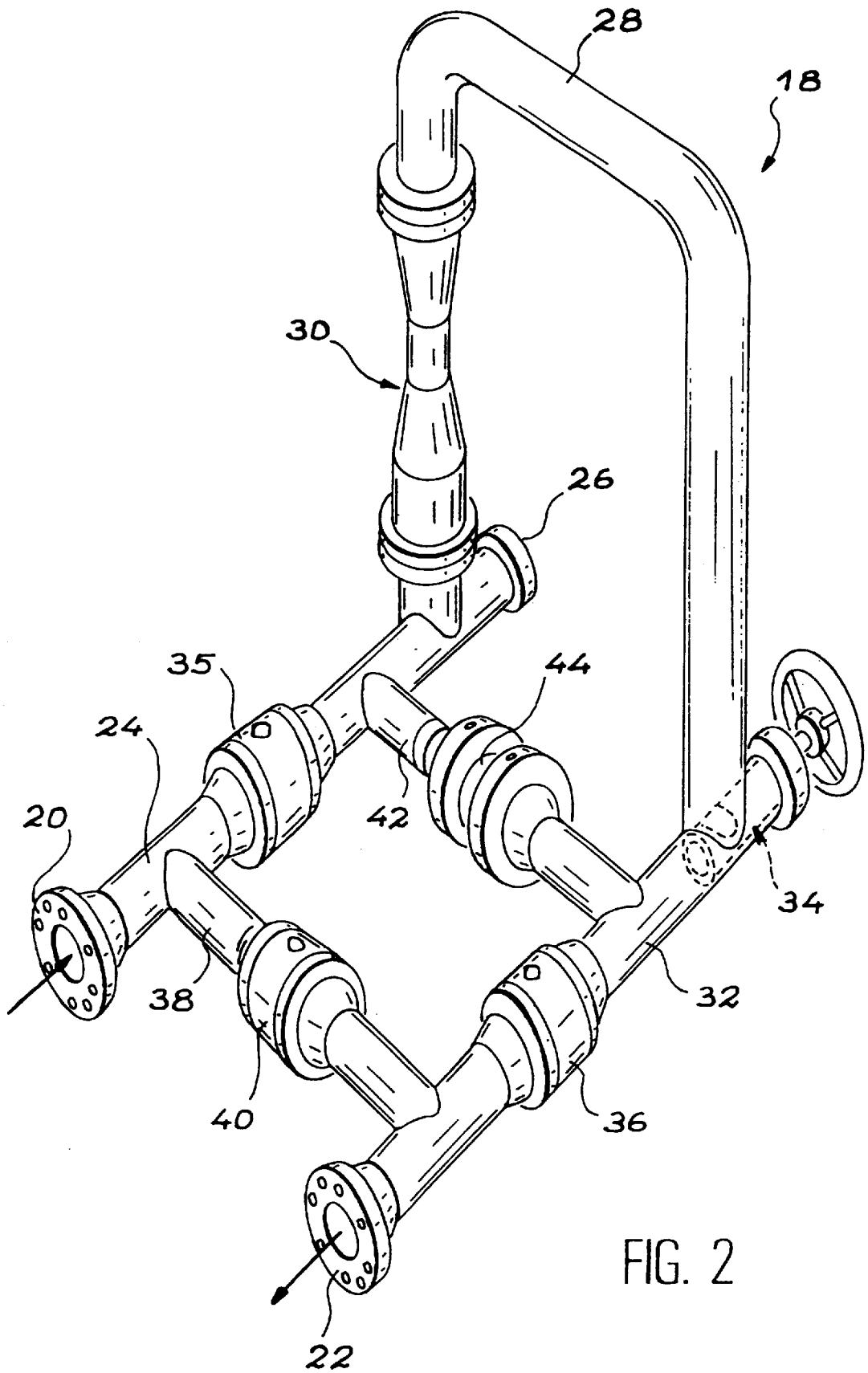
FIG. 2 is a perspective view which shows in more detail a preferred embodiment of a flow-rate measurement installation according to the invention.

A preferred embodiment of the measurement installation 18 is shown by way of example in FIG. 2.

In this embodiment, the installation 18 is a removable installation organized to be connected respectively to the second piping segment 13 via a flange 20 and to a third piping segment 15 via a flange 22.

The flange 20 is formed at a first end of a first duct segment 24 that is rectilinear and horizontal and whose opposite end is closed off with a plug 26. In the vicinity of the plug 26, the bottom end of a first vertical branch of an upsidedown U-shaped second duct segment 28 opens out into the first duct segment 24.

A multiphase flowmeter 30 is placed in the first vertical branch of the second duct segment 28. The multiphase flowmeter 30 may be in any form without going beyond the ambit of the invention. In particular, it may be made in compliance with the teaching of above-mentioned French patent applications No 2 764 065 and 2 767 919.

The second vertical branch of the second duct segment 28 opens out via its bottom end into a third duct segment 32 that is rectilinear and horizontal, in the vicinity of a first end of said third segment 32. The flange 22 is formed at the other end of the third duct segment 32.

The adjacent ends of the duct segments 28 and 32 form an upside-down T in which, according to the invention, a back-pressure valve 34 is housed. More precisely, the back-pressure valve 34 is mounted in the open end portion of the third duct segment 32 into which the upside-down U-shaped duct segment 28 opens out. This valve makes it possible to establish an adjustable headloss in the piping segment 15 (FIG. 1) at the outlet of the flowmeter 30. For this purpose, the back-pressure valve 34 is adjustable either manually or automatically.

In the embodiment shown in FIG. 2, a valve 35 is placed in the first duct segment 24 between the flange 20 and the mouth of the second duct segment 28, and a valve 36 is placed in the third duct segment 32 between the flange 22 and the mouth of the second duct segment 28.

A by-pass duct 38 equipped with a valve 40 interconnects the duct segments 24 and 32 respectively upstream from the valve 35 and downstream from the valve 36.

In addition, a safety by-pass duct 42 interconnects the duct segments 24 and 32 respectively downstream from the valve 35 and upstream from the valve 36. This safety by-pass duct 42 is equipped with a disk 44 adapted to break when the difference in the pressures on either side of it exceeds a predetermined threshold.

The valves 35, 36, and 40 are non-adjustable on/off valves.

Preferably, the measurement installation 18 also includes means (not shown) making it possible to measure the total pressure drop inside the apparatus. The total pressure drop is equal to the pressure drop induced by the multiphase flowmeter 30 (when such a pressure drop exists) plus the adjustable pressure drop induced by the back-pressure valve 34.

To perform such measurement, it is possible to use in particular either a differential pressure gauge placed, for example, between the duct segments 24 and 32, or else two absolute pressure gauges respectively delivering the pressure value upstream from the flowmeter 30 and the pressure value downstream from the back-pressure valve 34.

Measuring the total pressure drop induced by the apparatus 18 makes it possible to test whether the flow of fluid in the apparatus is critical. So long as the flow is not critical, flow-rate measurements can be taken and considered valid.

Otherwise, i.e. if the pressure upstream from the apparatus is at least twice the downstream pressure, the back-pressure valve 34 is adjusted to reduce the headloss until the flow conditions are no longer critical. Critical flow conditions would counteract the effect of the choke 16 (FIG. 1) during flow-rate measurements. As a result, such measurements would be erroneous once the installation 18 has been removed and critical flow has again been established by the choke 16.

Figure 3:
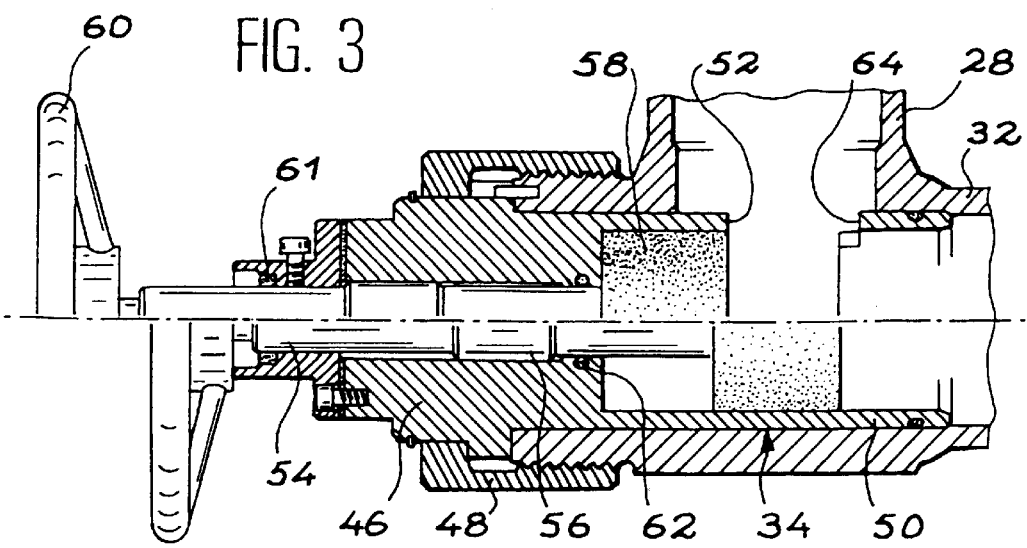
FIG. 3 is a longitudinal section view through a back-pressure cage valve suitable for use in the installation shown in FIG. 2.

FIG. 3 shows an embodiment of the back-pressure valve 34. In this case, it is a cage valve that is adjustable manually. As already noted, the valve may also be adjusted automatically. Instead of a cage valve, it is possible to use a different type of valve such as a needle valve without going beyond the ambit of the invention.

To facilitate understanding, the back-pressure valve 34 is shown in the top half of FIG. 3 in its fully open configuration in which it defines a maximum flow section, and in the bottom half of FIG. 3 in its minimum opening configuration defining a minimum flow section.

In the embodiment shown in FIG. 3, the back-pressure valve 34 comprises a cylindrical body 46 constituting packing removably mounted in the open end portion of the third duct segment 32 by means of a nut 48 screwed onto the threaded end of said segment. The nut 48 constitutes means for fixing the back-pressure valve 34 in sealed and removable manner in the T formed between the segments 28 and 32. The body 46 extends in the form of a tubular portion 50 beyond the mouth of the upside-down U-shaped second duct segment 28. A window 52 is provided in the tubular portion 50 facing the second duct segment 28 to enable the fluid to pass through when the valve 34 is in its fully open configuration procuring a maximum flow section.

A shaft 54 passes through the cylindrical body 46 of the back-pressure valve 34 in sealed manner along its axis and co-operates with the body 46 via a thread 56. At its end received inside the tubular portion 50, the shaft 54 carries a cage 58. A handwheel 60 is mounted at the other end of the shaft 54 outside the body 46 and outside the third duct segment 32. In addition, sealing means such as gaskets 61 and 62 are provided so that the fluid flowing in the installation is completely isolated from the outside.

When the cage 58 is brought to its fully open configuration, as shown in the top half of FIG. 3, the cage 58 is retracted into the tubular portion 50, so that the window 52 is totally unobstructed. A maximum flow section in the vicinity of the section of the piping 12 (FIG. 1) is then defined by the valve 34.

When the back-pressure valve 34 is adjusted, by acting on the handwheel 60, to bring it into its minimum opening position, as shown in the bottom half of FIG. 3, the cage 58 closes off the window 52, except for a notch 64 extending the window towards the other end of the third duct segment 32 facing the mouth of the second duct segment 28. As a result, the valve 34 then defines a non-zero minimum section. This characteristic makes it possible to guarantee a limited flow of fluid in this configuration. The minimum section is so determined that it does not exceed the pressure limit that can be withstood by the flowmeter 30, in the event that this limit is lower than the closure pressure of the oil well, i.e. lower than the wellhead pressure at a zero flow rate.

When the flow rates of the various phases of the well effluent are to be measured, the measurement installation 18 is mounted between the piping segments 13 and 15, as shown diagrammatically in FIG. 1. The presence of the back-pressure valve 34 then enables the measurements to be taken by adjusting the pressure in the flowmeter.

Figure 5:
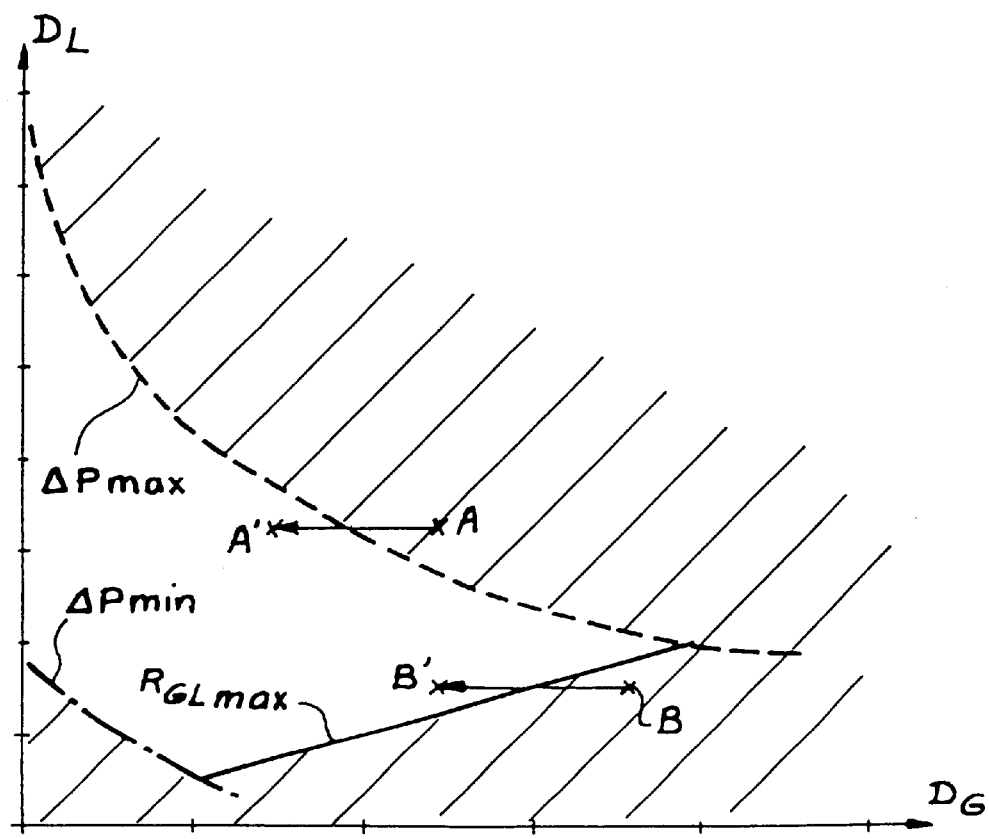
FIG. 5 shows the operating domain of a flowmeter, the flow rate $D_G$ of the gas phase being plotted along the x-axis and the total flow rate $D_L$ of the liquid phases being plotted up the y-axis.

As shown diagrammatically in FIG. 5, it is possible for the conditions at the wellhead to be incompatible with the measurement domain of the multiphase flowmeter 30 used. More precisely, for a given flowmeter, the measurement domain is defined in a reference diagram in which the gas flow rate $D_G$ is plotted along the x-axis, and the total liquid flow rate $D_L$ is plotted up the y-axis.

In a venturi flowmeter, the measurement domain is situated beneath a first curve ΔPmax (dashed line) representing the maximum allowable pressure drop across the flowmeter, and above a second curve ΔPmin (chain-dotted line) representing the minimum allowable pressure drop across the flowmeter.

Regardless of the type of flowmeter used, the measurement domain is also situated above a straight line $R_{GLmax}$ (uninterrupted line) representing the maximum gas-to-liquid ratio that can be measured by the flowmeter.

When the flow conditions at the wellhead correspond to point A in FIG. 5, a venturi flowmeter could not normally be used because the pressure drop exceeds the maximum pressure drop allowable inside the flowmeter (curve ΔPmax). In which case, by increasing the pressure in the flowmeter 30 by partially closing the back-pressure valve 34, it is possible to reduce the gas volume so that the initial flow conditions represented by point A are replaced by the flow conditions represented by point A'. If the headloss induced by the valve 34 is sufficient, then point A' lies within the measurement domain of the flowmeter (unshaded zone in FIG. 5). Measurement can then be performed.

Similarly, if the flow conditions are as represented by point B in FIG. 5, i.e. if the quantity of gas present in the liquid exceeds the threshold measurable by the flowmeter 30 (straight line $R_{GLmax}$), then by appropriately closing the back-pressure valve 34, it is possible to displace point B to a point B', by reducing the volume of the gas present at the flowmeter. Measurement is then possible if point B' lies within the measurement domain of the flowmeter (zone not hatched in FIG. 5).

It is also possible to adjust the back-pressure valve 34 so as to establish an optimum separation pressure $P_o$ in the multiphase flowmeter 30.

Figure 4:
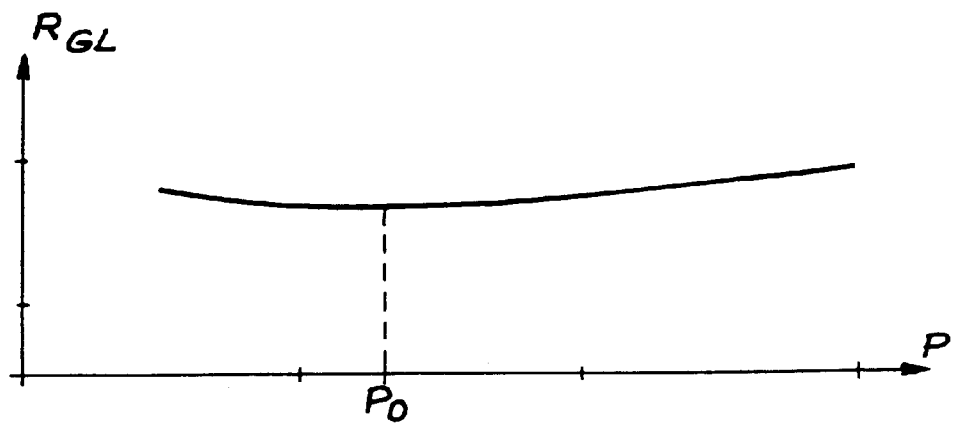
FIG. 4 is a curve given by way of example for a given oil well and showing how the ratio $R_{GL}$ between the gas phase and the liquid phases of the fluid varies as a function of the pressure P at which separation takes place.

In order to perform such adjustment, it is possible to take measurements for various values of the pressure in the flowmeter. The optimum separation pressure $P_o$ is the pressure for which the ratio $R_{GL}$ between the gas phase and the liquid phases is at a minimum, i.e. for which the liquid petroleum phase contained in the fluid is at a maximum (FIG. 4).

The possibility of causing the pressure in the multiphase flowmeter 30 to vary may also be used to verify the consistency of the results obtained during earlier trials.

Naturally, the invention is not limited to the embodiment described above by way of non-limiting example, but rather it covers all variants. Thus, the back-pressure valve 34 at the outlet of the multiphase flowmeter 30 may be installed differently, at a location other than a T, which may be closer to or further away from the flowmeter 30 than in the above-described embodiment.

What I claim is:

1. A method of evaluating an effluent from a hydrocarbon well, the effluent comprising liquid and gas phases, the method comprising:

providing a multiphase flowmeter in a pipe through which the fluid flows, the flowmeter comprising pressure adjusting means and a measurement means;

adjusting the pressure of the effluent using the pressure adjusting means such that the liquid and gas phases have their respective flow rates within the measurement domain of the measurement means;

measuring parameters of the liquid and gas phases using the measurement means; and evaluating the effluent based on the measurement of the liquid and gas phases.

2. A method according to claim 1, wherein, the pressure is adjusted so that the pressure drop in the venturi lies between predetermined values.

3. A method according to claim 1, wherein the pressure is adjusted so that the ratio between the flow rates of the gas phase and of the liquid phases is lower than a maximum ratio that can be measured by the flowmeter.

4. A method according to claim 2, wherein the pressure is adjusted so that the ratio between the flow rates of the gas phase and of the liquid phases is lower than a maximum ratio that can be measured by the flowmeter.

5. A method according to claim 1, wherein the pressure adjusting means comprises an adjustable back-pressure valve located in the flow section of the pipe, at the outlet of the flowmeter.

6. A method according to claim 5, wherein the back-pressure valve defines an adjustable flow section, the method comprising adjusting the flow section between a non-zero minimum section having its flow properties above the minimum acceptable flow characteristics for the flowmeter, allowing a limited flow of fluid to pass through; and a maximum section having its flow properties below the maximum acceptance flow characteristics for the flowmeter, the maximum section being close to the flow section of the pipe.

7. A method according to claim 5, wherein the back-pressure valve is a cage valve or a needle valve.

8. A method according to claim 6, wherein the back-pressure valve is a cage valve or a needle valve.

9. A method according to claim 5, wherein the back-pressure valve is mounted removably in a Tee-fitting in the pipe.

10. An installation for the evaluation of an effluent flowing from a pipe of a hydrocarbon well, the effluent comprising a combination of liquid and gas phases, the installation comprising:
a multiphase flowmeter connected downstream from the pipe and upstream from a region in which there is a determined pressure; and
means for adjusting the pressure in the flowmeter such that the liquid and gas phases have their respective flow rates within the measurement domain of said multiphase flowmeter.

11. An installation according to claim 10, wherein said means for adjusting the pressure are constituted by an adjustable back-pressure valve.

12. An installation according to claim 11, wherein the back-pressure valve defines a flow section that is adjustable between a non-zero minimum section having its flow properties above the minimum acceptable flow characteristics for the flowmeter, allowing a limited flow fluid pass through; and a maximum section having its flow properties below the maximum acceptance flow characteristics for the flowmeter, the maximum section being close to the flow section of the pipe.

13. An installation according to claim 11, wherein the back-pressure valve is a cage valve or a needle valve.

14. An installation according to claim 12, wherein the back-pressure valve is a cage valve or a needle valve.

15. An installation according to claim 11, wherein the back-pressure valve is mounted in a Tee-fitting in the pipe by means of sealed and removable fixing means.

16. A method of evaluating the effluent of a hydrocarbon well at a controlled pressure by means of a multiphase flowmeter connected to the well, comprising the step of adjusting the pressure in the flowmeter by means of an adjustable back-pressure valve located in the piping, at the outlet of the flowmeter, so that the respective flow rates of the liquid phases and of the gas phase of the fluid lie within the measurement domain of the flowmeter.

17. A method of evaluating an effluent of a hydrocarbon well at a controlled pressure by means of a multiphase flowmeter connected to the well, comprising the step of adjusting the pressure in the flowmeter by means of an adjustable back-pressure valve removably mounted in a Tee-fitting of the piping, at the outlet of the flowmeter, so that the respective flow rates of the liquid phases and of the gas phase of the fluid lie within the measurement domain of the flowmeter.

18. An installation for an evaluation of the effluent of a hydrocarbon well, comprising a multiphase flowmeter placed downstream from the well and upstream from a region in which there is a determined pressure, and means for adjusting the pressure in the flowmeter, said means being constituted by an adjustable back-pressure valve, so that the respective flow rates of the liquid phases and of the gas phase of the fluid lie within the measurement domain of the flowmeter.

19. An installation for an evaluation of the effluent of a hydrocarbon well, comprising a multiphase flowmeter placed downstream from the well and upstream from a region in which there is a determined pressure, and means for adjusting the pressure in the flowmeter, said means being constituted by an adjustable back-pressure valve mounted in a Tee-fitting of the piping by means of scaled and removable fixing means, so that the respective flow rates of the liquid phases and of the gas phase of the fluid lie within the measurement domain of the flowmeter.

* * * * *